May 27, 1958  W. T. ROSSELL  2,836,130
JOURNAL BEARING ASSEMBLY
Filed Nov. 13, 1956
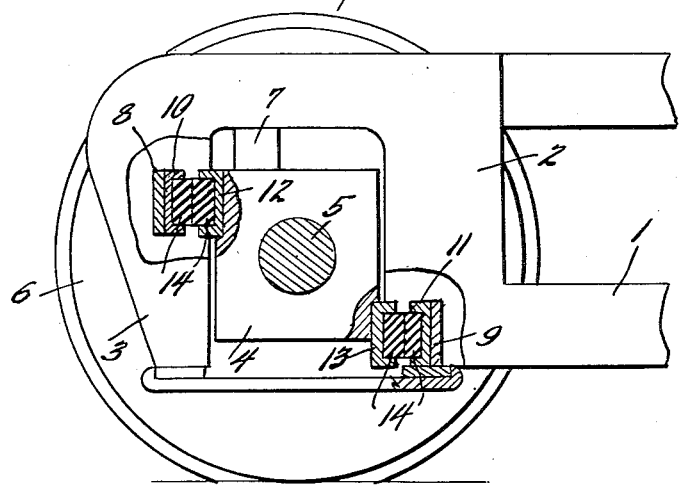
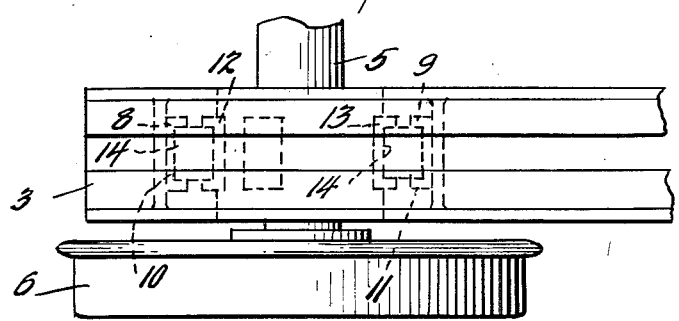
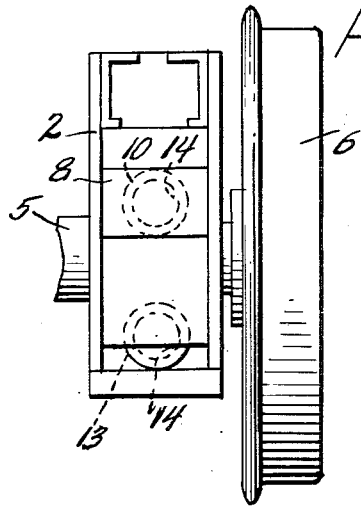
INVENTOR
WILLIAM T. ROSSELL
BY 
ATTORNEY

United States Patent Office 2,836,130
Patented May 27, 1958

2,836,130

JOURNAL BEARING ASSEMBLY

William T. Rossell, New York, N. Y., assignor to Transit Research Corporation, New York, N. Y., a corporation of New York Application November 13, 1956, Serial No. 621,756

4 Claims. (Cl. 105—224)

This invention relates to rail trucks and more particularly to the journal bearing assembly thereof and has for its obect to provide a truck in which hunting motions will be kept at a minimum.

It is known that when pedestal guides are employed to limit the relative movements between journal bearings and a truck frame it is possible for the axles of a truck to assume an out-of-parallel relation and also a relation in which both axles will be parallel but out of normal to the direction of truck travel. Either of these two conditions cause hunting. One the other hand, if the axles have no freedom of movement with respect to the frame, then the truck will de-rail. It has been proposed to insert rubber between the pedestal guides and the journal bearings to overcome the complete but limited freedom of the movement of the journal bearings but this does not provide a solution because the rubber yields and any energy which it absorbs must be returned in the manner of a simple spring.

It is the principal object of this invention to provide means for jamming the journal bearing against the pedestal guides with a force sufficient to overcome all free movements of a journal bearing with respect to its guides during ordinary straight away running, but with a force insufficient to prevent a breakaway of the journal bearing from fixed position with respect to its pedestal guides at any time when it encounters a greater force. Automatic return to jammed relation occurs as soon as the greater force ceases.

Another object is to employ the gravity load of any selected portion of the weight of the truck frame and car body to set up this jamming action.

More specifically it is an object of this invention to support the weight of the truck frame and the car body carried thereby by means of a spring atop each journal bearing, the springs each being offset from the vertical center line of the bearings to set up a rotative force. I then use this rotative force to urge diagonal corners of the journal bearings into engagement with pads carried by the pedestal guides, the pads being either resilient or frictional.

Other objects and advantages will become hereinafter more fully apparent as reference is had to the accompanying drawings in which my invention is illustrated and in which Figure 1 is a side view of a pedestal guide and journal bearing assembly of one corner of a rail truck, with portions broken away to show by invention, the view being taken from the inside of the truck, Figure 2 is a top plan view of the structure of Figure 1, Figure 3 is an end view of the construction of Figures 1 and 2, and Figure 4 is an enlarged vertical section of a modified form of wear pad as shown in section in Figure 1.

More particularly, 1 indicates the main side frame of a rail truck having pedestals 2 and 3 integral therewith to form the pedestal guide for a journal bearing 4. The side frame 1 is of dual part construction as shown in Figures 2 and 3. An axle 5 is journalled in the bearing 4 and is supported at each end by a wheel 6.

The frame 1 is supported from the journal bearing 4 by a small spring 7 preferably in the form of a rubber block offset from a vertical plane containing the axis of the axle. The offset of the spring 7 causes the weight of the frame 1 to tend to rotate the journal bearing 4 on the axle 5, the magnitude of the force depending upon the extent of the off-set. As illustrated in Figure 1, the off-set of the spring 7 is to the left and hence the journal bearing 4 tends to rotate in a counter-clockwise direction.

Seated in the two parts of the frame 1 at substantially diagonally opposite points with respect to the axle 5 are two seats 8 and 9 to receive cups 10 and 11 respectively. Corresponding cups 12 and 13 are seated in the journal bearing 4.

Each member of the pairs of cups 8, 12 and 9, 13 contains material 14 to accept wear and to permit relative vertical movement of the journal bearing 5 with respect to the pedestals 2 and 3. This material may be of resilient material such as rubber, as illustrated at 14 in Figure 1, but is preferably of hardened steel in the form of pads or inserts which fit snugly into the cups and which project beyond the cup walls, as illustrated at 14a in Figure 4.

In operation, the rotative force caused by off-setting the spring 7 with respect to the journal bearing causes the insert 14 in the cups 12 and 13 to exert pressure against the adjacent inserts in the cups 10 and 11. The axle 5 is thus held in fixed relation with respect to the pedestals 2 and 3 with a force proportional to the weight imposed by the frame 1 and the amount of the off-set of the spring 7. This force is selected to retain this relation between the axle and the pedestals for normal straight running. However, as soon as this force is overcome by a greater force the axle can alter its position slightly with respect to the pedestals. The effect will be to rotate the journal bearing slightly in a clockwise direction. When the greater force ceases the normal relation will immediately be resumed automatically.

Various changes in design to accommodate my invention to trucks of different design may be made without departing from the spirit of my invention and I therefore desire to be extended protection as defined by the appended claims wherein.

What I claim is:

1. The combination of pedestal guides, a journal bearing positioned between said guides, a spring supporting said guides directly from said bearing, the center line of said spring being offset with respect to and parallel to a vertical plane through the axis of said journal bearing thereby setting up a rotative force about the axis of said bearing, and pads inserted between the pedestal guides and said journal bearing at diagonally opposite corners of said journal bearing jointly opposing said rotative force.

2. In a rail truck, a truck frame having a pair of vertically disposed pedestal guides at each corner thereof, a journal bearing between the members of each said pair of pedestal guides, a spring atop each said journal bearing directly supporting one corner of said frame, each said spring having its center line offset with respect to and parallel to a vertical plane containing the axis of its journal bearing, and a pad separating diagonal corners of each journal bearing from its adjacent pedestal guide, each said journal bearing normally exerting pressure against both of its diagonally spaced pads.

3. A journal bearing assembly for a rail truck comprising a pair of pedestal guides, a journal bearing between said guides, a spring supporting said guides located directly atop said journal bearing and having its center line bodily offset with respect to a vertical plane containing the axis of said journal bearing and a pad of rubber-like material located at diagonally opposite corners of said journal bearing separating each said corner from its adjacent pedestal guide, each said journal bearing normally exerting pressure against both of its diagonally spaced pads.

4. A journal bearing assembly for a rail truck comprising a pair of pedestal guides, a journal bearing between said guides, a spring supporting said guides located directly atop said journal bearing and having its center line offset with respect to a vertical plane containing the axis of said journal bearing and a pad of friction material located at diagonally opposite corners of said journal bearing separating each said corner from its adjacent pedestal guide, each said journal bearing normally exerting pressure against both of its diagonally spaced pads.

References Cited in the file of this patent

UNITED STATES PATENTS

| | | |
|---|---|---|
| 2,079,848 | Eastburg | May 11, 1937 |
| 2,207,848 | Barrows | July 16, 1940 |
| 2,250,568 | Borup | July 29, 1941 |
| 2,474,008 | Meyer | June 21, 1949 |
| 2,598,082 | Tack | May 27, 1952 |
| 2,774,312 | Rossell | Dec. 18, 1956 |

FOREIGN PATENTS

| | | |
|---|---|---|
| 487,468 | Great Britain | June 21, 1938 |
| 480,614 | Italy | May 7, 1953 |